United States Patent [19]
Tanabe et al.

[11] 3,942,188
[45] Mar. 2, 1976

[54] MAGNETIC TAPE REPRODUCING SYSTEM

[75] Inventors: Kenzo Tanabe; Mineo Mino, both of Katano, Japan

[73] Assignee: Matsushita Electric Industrial Co., Ltd., Japan

[22] Filed: Oct. 31, 1974

[21] Appl. No.: 519,786

Related U.S. Application Data

[63] Continuation of Ser. No. 367,185, June 5, 1973, abandoned.

[52] U.S. Cl. ............................. 360/10; 360/11
[51] Int. Cl.² ............................. H04N 5/795
[58] Field of Search ............. 360/10, 9, 11, 35; 178/6.6 FS, 6.6 SF

[56] References Cited
UNITED STATES PATENTS

| | | | |
|---|---|---|---|
| 3,283,068 | 11/1966 | Urry et al. | 360/9 |
| 3,395,385 | 7/1968 | Scoville | 178/6.6 FS |
| 3,504,119 | 3/1970 | Baldwin | 360/10 |
| 3,636,253 | 1/1972 | Notani | 360/10 |
| 3,777,054 | 12/1973 | Loughry | 178/6.6 SF |
| 3,813,484 | 5/1974 | Mino et al. | 360/10 |

FOREIGN PATENTS OR APPLICATIONS

| | | | |
|---|---|---|---|
| 43-11421 | 5/1968 | Japan | 360/10 |
| 44-14299 | 6/1969 | Japan | 178/6.6 FS |

*Primary Examiner*—Raymond F. Cardillo, Jr.
*Attorney, Agent, or Firm*—Wenderoth, Lind & Ponack

[57] ABSTRACT

A magnetic tape reproducing system for providing a still picture of a slow motion picture. A magnetic tape is provided on which video signals are recorded in successive fields of a unit length in the longitudinal direction of the tape and a plurality of rotary magnetic reproducing heads are placed on the periphery of a rotating disc at equal angular intervals from each other so as to reproduce one complete field of the video signals. The magnetic reproducing heads are arranged so that the distance between the two gaps of two adjacent heads is equal to an integral multiple of the distance along the tape corresponding to a period of horizontal synchronizing signals contained in the video signals.

2 Claims, 6 Drawing Figures

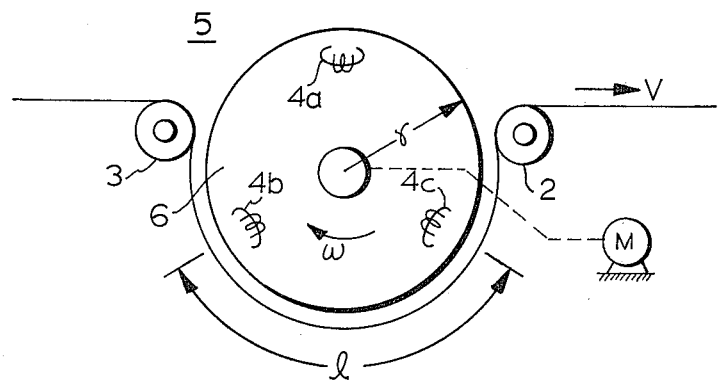
FIG.1
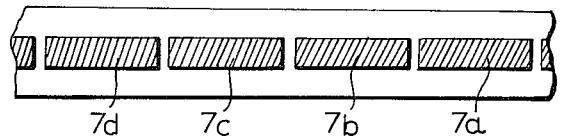
FIG.2
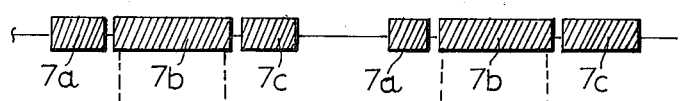
FIG.3a
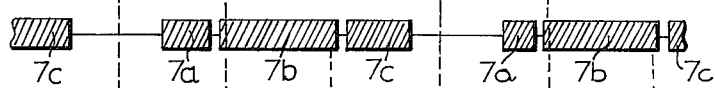
FIG.3b
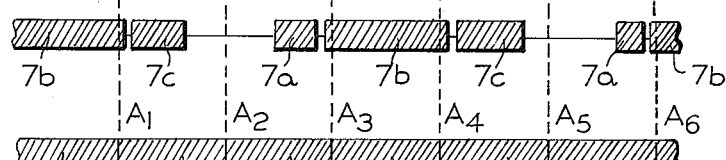
FIG.3c
FIG.3d

MAGNETIC TAPE REPRODUCING SYSTEM

This application is a continuation of application Ser. No. 367,185 filed June 5, 1973, now abandoned.

BACKGROUND OF THE INVENTION

This invention relates to a magnetic tape reproducing system, and more particularly to a magnetic tape reproducing system for reproducing television signals which are recorded longitudinally on a magnetic tape in successive fields.

Heretofore there have been proposed several methods for presenting a still picture or a slow motion picture, for example by reproducing the same field of television signals, which are recorded on a magnetic tape in the longitudinal direction thereof, a plurality of times successively by a plurality of rotary reproducing heads.

However, in a conventional magnetic recording and reproducing apparatus for providing such a still picture by reproducing the same field of the video signals repeatedly, there is a problem that owing to deviation of the horizontal synchronizing signal of the video signal there is caused a skew distortion and it results in poor picture quality.

Therefore, an object of the present invention is to provide a novel and improved magnetic recording and reproducing apparatus for presenting a still picture or a slow motion picture having a better picture quality.

Another object of the invention is to provide a novel magnetic tape reproducing system for reproducing a still picture, which is stable and has no skew distortion, from the video signals recorded in the longitudinal direction on a magnetic tape in successive fields.

A further object of the invention is to provide a novel magnetic tape reproducing system for presenting a stable still picture by using a plurality of rotary reproducing heads.

These objects are achieved by providing a magnetic tape reproducing system according to the present invention, which comprises a magnetic tape on which video signals are recorded in successive fields of a unit length in the longitudinal direction of said magnetic tape, each field of said video signals containing horizontal synchronizing signals, a rotating disc, a driving means for rotating said rotating disc, and a plurality of reproducing magnetic heads which are placed on the periphery of said rotating disc at equal angular intervals relative to each other, each of said plurality of reproducing heads being arranged so as to reproduce a quasi-complete one field of said video signals and being arranged so that the distance between two gaps of two adjacent heads is equal to an integral multiple of the distance along the tape corresponding to a period of a horizontal line period.

BRIEF DESCRIPTION OF THE DRAWINGS

These and other objects and features and advantages of the invention will be apparent from a consideration of the following detailed description with reference to the accompanied drawings, wherein:

FIG. 1 shows the head assembly of three rotary magnetic heads and the magnetic tape for explaining an embodiment of the invention;

FIG. 2 shows a part of the magnetic tape used in the apparatus according to the invention showing the track pattern of the tape, on which the signals of fields extracted intermittently from the video signals are recorded successively in the longitudinal direction of the tape by the assembly of three rotary heads shown in FIG. 1; and FIGS. 3a to 3c show the patterns of the video signals reproduced from the magnetic tape shown in FIG. 2 by the three rotary magnetic heads, respectively, and FIG. 3d shows the pattern of the video signal synthesized from the effective parts of the reproduced video signals 3a to 3c.

DETAILED DESCRIPTION OF THE PREFERRED EMBODIMENT

Referring to FIGS. 1 to 3, an embodiment of the invention will be described in detail which uses three rotary magnetic heads.

FIG. 1 shows the relation between the head assembly having three rotary magnetic heads and a magnetic tape, wherein the magnetic tape designated by a reference numeral 1 is moved in the direction of arrow V by fixed guide rollers 2 and 3. The rotary head assembly 5 comprises a rotary disc 6 and three magnetic heads 4a, 4b and 4c arranged at equal angular intervals of 120° along the periphery of the rotary disc 6, and the disc 6 is rotated in the direction of arrow $\omega$.

The driving means for rotating the rotary disc 6 is a motor M. The moving means for moving the magnetic tape 1 is omitted herewith for simplifying the description. Further, although the direction of rotation is optional in the system according to the invention, the following description is for rotation in the direction of the arrow $\omega$.

Referring to FIG. 2, there is shown a track pattern of each of the fields 7a, 7b, 7c and 7d of the video signals which are for one field and which are extracted intermittently from the video signals and recorded successively in the longitudinal direction of the magnetic tape 1 by the three rotary magnetic heads of FIG. 1. In case of FIG. 2, there exists between the two adjacent recorded field patterns a narrow portion where the signal is not recorded. However, if the period for sampling one field of the video signal is shortened a little during recording, there exists a portion where parts of the two adjacent fields overlap instead of the portion where no signal exists, as described above. However, as will be obvious from the description presented hereinafter, the fundamental operation of the system of the invention is substantially the same for both cases described above, i.e. where there is a portion having no signal or where there is an overlapping portion, and so the following description is presented for the case shown in FIG. 2.

Further, in order to provide the recorded track pattern as shown in FIG. 2, it is not necessary to use three rotary magnetic heads. It is of course possible to use a system having one rotary head, two rotary heads or a fixed head.

FIGS. 3a to 3c show the output signals reproduced by the rotary magnetic heads 4a, 4b and 4c, respectively during movement of the magnetic tape on which the video signals are recorded as shown in FIG. 2 around the disc 6 having the three rotary magnetic heads thereon. FIG. 3d shows the output signal which is synthesized from the effective parts of each of the reproduced signals 3a to 3c.

As shown in FIG. 1, the length of the magnetic tape 1 wound around the rotary disc 6 is at least as long as the length of the two fields of the recorded video signals shown in FIG. 2. Therefore, each of the signals of FIGS. 3a, 3b and 3c reproduced by the magnetic heads 4a, 4b and 4c, respectively contains video signal information for a quasi-complete one field. In FIGS. 3a to 3b, such a quasi-complete one field, the field 7b as an example, is indicated by hatching.

FIG. 3d shows a train of successive such quasi-complete one fields 7b, one of the fields of the recorded video signal, which is continuously synthesized for providing a still picture signal. The signal 3d is provided by switching the reproduced signals from the magnetic heads 4a, 4b and 4c in turn at the times $A_1$, $A_2$, $A_3$, . . ., as shown in FIG. 3. As a practical means for obtaining the synthesized signal of FIG. 3d, for example, the reproduced signals from the rotary magnetic heads 4a, 4b and 4c are taken out of the heads by a conventional slip-ring brush or rotary transformers, and on detecting a control signal such as a vertical synchronizing signal contained in each field of the signals, the signals from each of the magnetic heads are synthesized by driving a well-known suitable switching circuit by that detected control signal. Such a circuit can be a ring counter made up of flip-flops as discussed in *Source Book of Electronic Circuits*, John Markus, McGraw-Hill, 1968, pages 161 and 165. For example, a vertical sync pulse obtained by passing, through a vertical sync separator circuit, the signals reproduced from the head or such a vertical sync pulse modified so as to have a time delay can be used as the control signal. By using the control signal as a clock pulse for a 3-stage ring counter, i.e. by using the control signal as a driving signal for driving each of the gate circuits which control the outputs of the three heads in accordance with the outputs of the three flip-flops which are the fundamental elements, and by mixing the three outputs of the gate circuits, the outputs of the three heads can be used as a one-field TV signal which has the outputs of the three heads connected in the correct time relationship.

The signal of FIG. 3d is a signal for a still picture from the quasi-complete one fields, and if the horizontal synchronizing periods of each field are not related correctly and continuously at the times $A_1$, $A_2$, $A_3$, . . . when the output signals from each of the magnetic heads are switched, there is caused, as well known, so-called skew distortion which usually results in a poor picture which is distorted to the right or left at the upper part of the picture on a monitor TV receiver.

According to the magnetic tape reproducing system of the invention, such a skew distortion can be eliminated by arranging the distance $l$ along the periphery of the disc 6 between the two adjacent heads of the plurality of reproducing magnetic heads to be $n$ ($n$ is an integer around 262, for example 262 or 263) times the length corresponding to the period of the horizontal synchronizing signal to produce a quasi-complete one field. This relation of lengths is accomplished by adjusting the speed of movement of the magnetic tape during recording, the rotating speed of the recording magnetic heads and the radial distance thereof from the center of rotation, and the radial distance of the reproducing magnetic heads from the center of rotation thereof, and by relating these values to each other. This aspect of the invention is described in more detail in the following.

There will first be considered what occurs around the switching time $A_3$ in FIG. 3, that is the junction point $A_3$ between the still picture signals provided by synthesizing the reproduced signals from each of the rotary magnetic heads 4a, 4b and 4c. At a portion a little before the point $A_3$, the signal of FIG. 3d is the output signal from the head 4b, and at a portion a little after the point $A_3$, the signal of FIG. 3d is the output signal from the head 4c. As for the signal of FIG. 3d indicated at the point $A_3$, the reproduced signal from the head 4c has a phase delayed with respect to that of the signal reproduced from the head 4b, and the amount of the phase delay corresponds to the distance on the magnetic tape between two points where the air gaps of the head tips of the heads 4b and 4c contact the tape, respectively while reproducing. The distance between these two points is designated by $l$ in FIG. 1. That is, the signal of FIG. 3d represents the condition that the signal for the same field is always provided at a phase delayed by an amount corresponding to the distance between the respective control points of the heads.

Accordingly, when the length $l$ coincides with integral multiple of the length corresponding to the period of the horizontal synchronizing signals, the horizontal synchronizing periods are correctly and continuously related at each of the junction points of the still picture signal 3d. Therefore, skew distortion is never caused. The same is true for the other junction points $A_1$, $A_2$, $A_4$, . . . besides $A_3$.

When, during reproducing, the three rotary magnetic heads 4a, 4, and 4c in FIG. 1 are arranged correctly at the equal intervals of 120°, the above mentioned length $l$ between the two points where the air gaps of the head tips of each two adjacent magnetic heads contact with the magnetic tape is expressed as follows:

$$l = 2\pi\gamma p/3 \tag{1}$$

wherein $\gamma p$ is the radial distance of the reproducing rotary magnetic heads from the center of rotation. On the other hand, the relative speed of the magnetic tape and the rotary magnetic heads is expressed as $(\omega_R\gamma_R + V_R)$, in which $V_R$ is the speed of movement of the magnetic tape during recording, $\omega_R$ is the speed of rotation of the recording rotary magnetic heads and $\gamma_R$ is the radial distance thereof from the center of rotation. Therefore, in the time interval of $T_H$, which is the period of horizontal synchronizing pulse, the composite video signal is recorded on a length of tape corresponding to $(\omega_R\gamma_R + V_R)T_H$ which relates to the horizontal one line.

For the condition for removing skew distortion, that is for making the length $l$ equal to an integral multiple of the length corresponding to the period of the horizontal synchronizing signals, the following equation must be satisfied:

$$2\pi\gamma p/3 = n(\omega_R\gamma_R + V_R)T_H \tag{2}$$

in which $n$ is an arbitary integer for satisfying the continuity of the horizontal synchronizing pulse (to avoid skew distortion). However, for reproducing a quasi-complete one field, it is desirable to select the integer $n$ around 262 (e.g. 261, 262, 263) because one complete field (according to the conventional definition) contains 262.5 horizontal lines.

The above equation (2) is of course also applicable for the case in which the speed $V_R$ of the magnetic tape during recording is zero and for a fixed head system where $\gamma_R$ is zero.

Further, although in the above embodiment the description has been for the case in which the switching of the reproduced signals from each of the magnetic heads is carried out, as will be obvious from FIG. 3d, in the same field of the reproduced signal, other ways are also possible for satisfying the above condition. For example, when recording the signals a quasi-complete one field extracted by sampling on the magnetic tape a signal a little longer than a conventional complete one field may be recorded, or it is also of course possible that during reproducing the value of $n$ in the equation (2) may be set to a value smaller than 262. Although the still picture signal provided in such a way is not a signal of the normal standard TV system used in Japan or the U.S.A., it does not cause any trouble during the display of the signal on a conventional monitor TV receiver.

Further, although the system has been described hereinbefore for three rotary magnetic heads, the subject of the invention can be used with other optional numbers of rotary heads.

There has been described hereinbefore a preferred embodiment of the invention, and it is apparent that various modifications may be made without departing from the spirit and scope of the invention which is defined by the following claims.

What is claimed is:

1. A magnetic tape reproducing system comprising a magnetic tape on which video signals are recorded in successive fields of a unit length in the longitudinal direction of said magnetic tape, each field of said video signals containing horizontal synchronizing signals, a rotating disc, a driving means coupled to said disc for rotating said rotating disc, a plurality of reproducing magnetic heads on the periphery of said rotating disc at equal angular intervals from each other, each of said plurality of reproducing heads being for reproducing a quasi-complete one field of said video signals, and means for moving said tape around said disc past said heads, all the distances on the periphery of said disc between the gaps of two adjacent heads at the relative speed of the tape and the disc being equal to each other and equal to an integral multiple of the distance $(\omega_R r_R + V_R) T_H$ along said tape corresponding to the length on the tape of said horizontal synchronizing signals, said integral multiple being around 262, $\omega_R$ being the speed of rotation of the recording heads for recording the signals, $r_R$ being the radial distance of each recording head from the center of rotation thereof during recording, $V_R$ being the speed of the magnetic tape during recording, and $T_H$ being the period of said horizontal synchronizing signals.

2. A magnetic tape reproducing system as claimed in claim 1, wherein there are three of said reproducing rotary magnetic heads and the length of said magnetic tape which is wound around said rotating disc extends more than 240° around said disc.

* * * * *